United States Patent [19]
Kohlmeyer

[11] Patent Number: 5,413,031
[45] Date of Patent: May 9, 1995

[54] ALIGNMENT COUPLER FOR LINEAR DEVICE

[75] Inventor: Bruce E. Kohlmeyer, Wadsworth, Ohio

[73] Assignee: Parker-Hannifin Corporation, Cleveland, Ohio

[21] Appl. No.: 178,168

[22] Filed: Jan. 6, 1994

[51] Int. Cl.$^6$ ............................. B23Q 1/00; F16J 7/00
[52] U.S. Cl. ..................... 92/165 R; 92/165 PR; 92/140; 403/122; 403/145
[58] Field of Search ............... 403/131, 135, 137, 145, 403/148, 122, 124, 125, 127, 140; 92/165 R, 165 PR, 168, 129, 140

[56] References Cited

U.S. PATENT DOCUMENTS

| | | |
|---|---|---|
| 843,004 | 2/1907 | Dock . |
| 3,158,391 | 11/1964 | Carmi et al. . |
| 3,172,340 | 3/1965 | Blenkle . |
| 3,414,302 | 12/1968 | Priest . |
| 3,501,180 | 3/1970 | Waara .............................. 403/124 |
| 3,670,630 | 6/1972 | Tyson et al. ..................... 92/129 |
| 3,857,642 | 12/1974 | Miller ............................... 92/129 |
| 5,115,725 | 5/1992 | Horiuchi . |

OTHER PUBLICATIONS

Parker-Hannifin Corporation Bulletin 1034, pp. 17–18, dated Sep., 1990, entitled "Cylinder Innovations."

Primary Examiner—Thomas E. Denion
Attorney, Agent, or Firm—Christopher H. Hunter

[57] ABSTRACT

A linear device includes a housing supporting a central hydraulic or pneumatic cylinder and a pair of support shafts on either side of the central cylinder. The cylinder includes a longitudinally-moveable piston rod which is attached at its distal end to a tooling plate. An alignment coupler is received within a cavity in the tooling plate, and interconnects the cylinder piston rod and the tooling plate. The alignment coupler includes an annular bearing pad with an inner planar surface disposed adjacent an inner endwall of the cavity, and an outer convex curved surface facing away from the inner endwall. A T-shaped operating rod is disposed within the cavity having an annular shoulder flange with a concave curved inner surface adjacent to the curved surface of the bearing pad, and a convex curved outer surface. An annular bearing washer is disposed in the cavity against the shoulder flange of the operating rod and has a concave curved inner surface adjacent to the convex curved outer surface on the shoulder flange. A threaded end cap is received within the opening to the cavity in the tooling plate, and retains the bearing pad, the operating rod and the bearing washer within the cavity. The end cap includes a central aperture through which the stem of the operating rod extends. The distal end of the operating rod has a threaded opening to receive the threaded end of the cylinder drive piston. The configuration of the adjacent surfaces of the bearing pad, the operating rod shoulder flange, and the bearing washer enables the operating rod to move in rotational and angular relation within the cavity. Moreover, the outer peripheral dimensions of the bearing pad, the operating rod shoulder flange and the bearing washer are less than the inner diameter of the cavity, such that the operating rod can also move laterally between the sidewalls in the cavity.

23 Claims, 3 Drawing Sheets

ALIGNMENT COUPLER FOR LINEAR DEVICE

FIELD OF THE INVENTION

The present invention relates generally to linear devices for moving tooling or other components, and more specifically to linear devices having alignment couplers which allow a certain amount of misalignment to occur between the cylinder piston rod and the tooling plate of the linear device.

Previous Methods

Certain linear devices are used to move tooling or other automation components in a plant or manufacturing facility. One such linear device includes a hydraulic or pneumatic cylinder having a longitudinally-extending piston rod. The piston rod is attached at its distal end to a tooling plate. The tooling or other automation component is mounted to the tooling plate, and moves linearly in response to the actuation of the piston rod. A plurality of linear devices can be used concurrently to provide a particular movement requirement for material handling, packaging, product testing, assembly, etc.

To support the tooling plate in its linear travel, the cylinder is mounted within a housing, and a pair of support shafts are located on either side of the piston rod and attached at their distal ends to the tooling plate. The support shafts extend longitudinally through bores formed in the housing and ride freely on bushings or bearings. Other bushings or bearings surround the piston rod in the cylinder, and form a seal to prevent hydraulic fluid from leaking around the piston rod. Upon actuation of the cylinder, the tooling plate is linearly moved by the piston rod and guided by the support shafts to move the tooling or other automation components appropriately.

In certain situations, tight tolerances are required between the support shafts and the piston rod. This can be due to the precise nature of movement required, or can be due to some applications requiring a relatively small linear device. In such situations, it can be difficult to accurately align the piston rod and the support shafts with the tooling plate such that the piston rod and support shafts do not bind, catch or side-load against the bearings or bushings during the stroke of the piston rod. Such alignment problems can occur during initial assembly of the linear device, or can occur over time as the linear device is in repeated use. The misalignment of the piston rod and support shafts can limit the stroke of the cylinder piston, and can degrade or wear down the bushings or bearings around the piston rod and the support shafts, thus causing hydraulic fluid or pressure loss around the piston rod.

To overcome these drawbacks, alignment couplers have been developed in an attempt to allow slight angular, rotational and lateral movement of the piston rod during the piston stroke such that alignment of the piston rod and support shafts is maintained. One such alignment coupler is manufactured by the assignee of the present invention under the mark NuTech Linear Alignment Coupler. This alignment coupler includes an outer housing enclosing a pair of opposed T-shaped operating members and a central bearing plate. Each T-shaped operating member has its head located within the housing, and its stem extending outwardly from opposite sides of the housing. The bearing plate is interposed between the heads of the T-shaped members and includes a radial or curved surface which allows a certain amount of rotational, lateral and angular movement to occur between the T-shaped members. One of the T-shaped members is screwed into a bore or threaded opening formed in the tooling plate, and the other of the T-shaped members is attached (e.g., threaded) onto the distal end of the piston rod. As the piston rod moves the tooling plate during its stroke, the alignment coupler allows a certain amount of misalignment to occur between the piston rod and the tooling plate. This misalignment or "self-centering" allows the full stroke of the piston rod to be realized, and prevents damage to the bushing or bearings around the piston rod in the cylinder and around the support shafts.

While the above-described linear alignment coupler increases the useable life of the linear device and has numerous advantages over linear devices operated without alignment couplers, the above type of linear alignment coupler necessitates a certain amount of offset between the tooling plate and the piston rod of the cylinder. This offset can be disadvantageous in certain situations where the overall size of the linear device is important. That is, it can be desirable in certain situations to minimize the offset between the piston rod and the tooling plate such that the overall size of the linear device is kept to a minimum.

Certain other connecting rod assemblies are known in the art which provide rotational, angular and/or lateral movement between a piston rod and a housing. Such assemblies are shown in Horiuchi, U.S. Pat. No. 5,115,725; Dock, U.S. Pat. No. 843,004; Priest, U.S. Pat. No. 3,414,302 and Carmietal, U.S. Pat. No. 3,258,391. While these assemblies appear to have some practical use in particular applications, none of these assemblies provide a linear device which minimizes the offset between a tooling plate and a piston rod of a cylinder such as to minimize the overall size of the assembly. As such, these patents do not teach to overcome the particular drawbacks which have been identified by the inventors.

Thus, it is believed that there is a demand in the industry for a linear device having an alignment coupler, wherein the offset between the cylinder piston rod and the tooling plate in the linear device is kept to a minimum.

SUMMARY OF THE INVENTION

The present invention provides a new and improved linear device having an alignment coupler which minimizes the offset between the cylinder piston rod and the tooling plate. As such, the overall size of the linear device is reduced while the advantageous properties of the alignment coupler are maintained.

According to the principles of the present invention, the alignment coupler includes a bearing pad and a T-shaped operating rod disposed in a cavity formed in the tooling plate. The bearing pad has an annular, dome-shaped configuration with a first planar surface adjacent to an endwall of the cavity in sliding relation thereto, and a second convex curved surface facing outwardly from the endwall. The operating rod has an annular, cup-shaped shoulder flange with an inner concave curved surface which is disposed against and slidingly engages the outer curved surface of the bearing pad, and an outer convex curved surface facing away from the bearing pad. A bearing washer having an inner concave curved surface is then disposed against the outer curved surface of the shoulder flange. Finally, an end cap with a central aperture is threadedly received within the opening to the cavity to retain the operating rod, the bearing pad and the bearing washer within the cavity.

The stem of the T-shaped operating rod extends outwardly a short distance through the aperture in the end cap and includes a threaded opening to receive the threaded end of the piston rod. The tooling plate is also supported for linear movement on a pair of support shafts extending longitudinally through the housing on opposite side of the cylinder. The support shafts are connected at their distal ends to the tooling plate and are supported on bushings or bearings in the housing.

The peripheral dimension of the bearing pad, the shoulder flance on the operating rod, and the bearing washer is less than the inner diameter of the cavity, such that the operating rod can move laterally in any direction within the cavity during the stroke of the cylinder piston. Moreover, the corresponding curved surfaces of the shoulder flange, the bearing pad, and the bearing washer enable the operating rod to move in rotational and angular relation with respect to the tooling plate. The present invention thereby provides an alignment coupler which allows for rotational, angular and lateral misalignment of the cylinder piston rod with respect to the tooling plate. Nevertheless, the length of the operating rod stem extending through the end cap is only sufficient to allow a wrench or other fastening device to be located therearound such that the piston rod can be securely threaded into the operating rod, and otherwise minimizes the offset required between the tooling plate and the piston rod.

Thus, the alignment coupler of the present invention prevents degradation of the bushings and bearings around the piston rod and the support shafts, and minimizes the offset between the tooling plate and the piston rod such that the overall size of the linear device can be kept to a minimum. Moreover, the alignment coupler is formed from relatively few pans, and is simple to install and/or replace on the linear device.

Other features and advantages of the present invention will become apparent from the following specification and attached claims.

DETAILED DESCRIPTION OF THE PREFERRED EMBODIMENT

Figure 1:
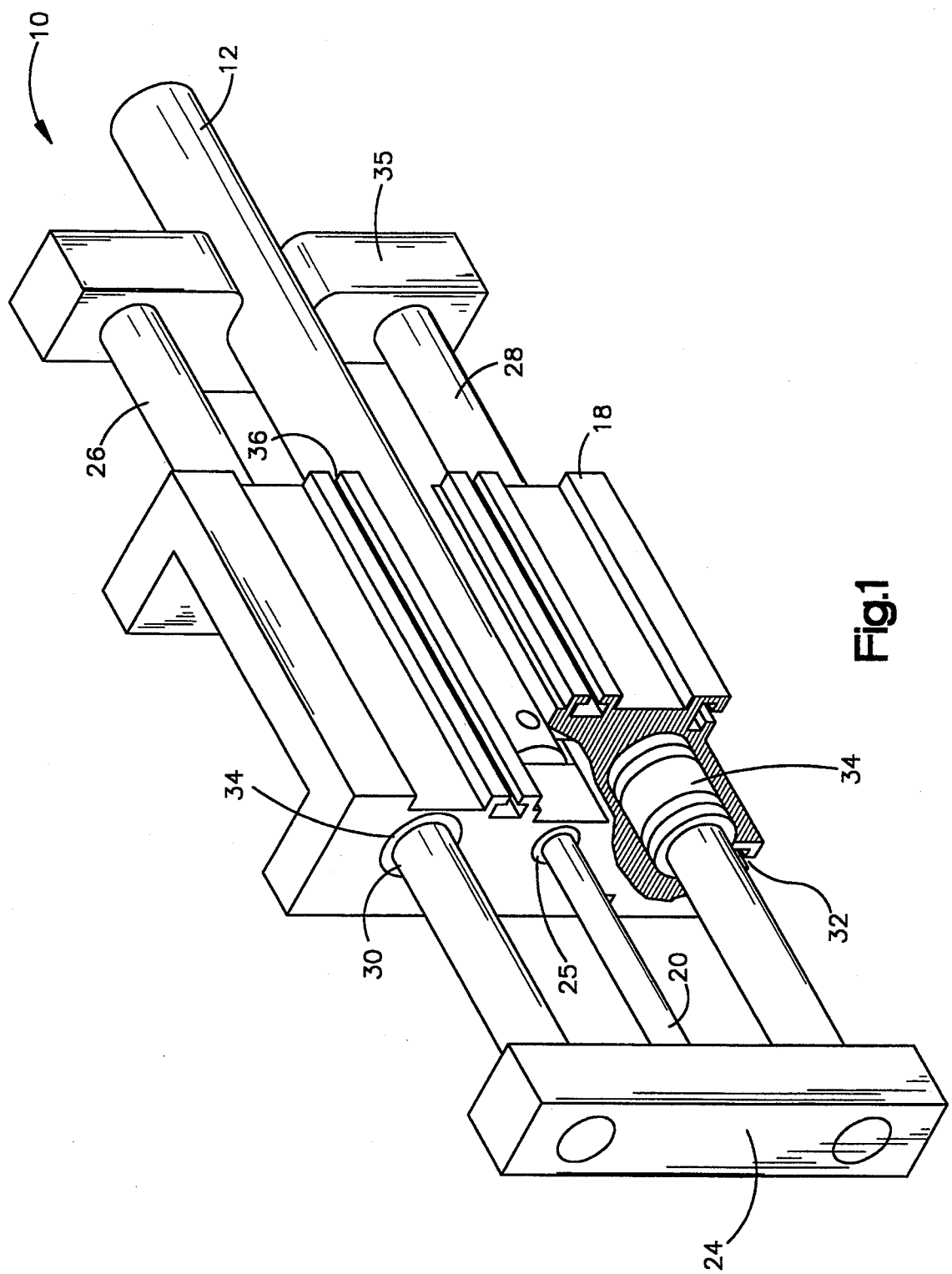
FIG. 1 is an elevated perspective view of linear device having an alignment coupler constructed according to the principles of the present invention.

Referring initially to FIG. 1, a linear device according to the present invention is indicated generally at 10. The linear device preferably includes a hydraulic or pneumatic stainless steel cylinder 12, one end of which is received and supported within an extruded aluminum cylinder housing 18. The cylinder 12 includes a stainless steel drive piston 20 which extends longitudinally outward from one end of the cylinder and is attached at its distal end to an anodized aluminum tooling plate 24, as will be described herein in detail a bushing or bearing 25 is disposed within the housing around the cylinder piston 20 to allow movement of the piston within the cylinder.

A pair of case hardened steel support shafts 26, 28 are disposed on opposite sides of the central cylinder 12 and extend longitudinally through bores 30, 32 in the housing parallel to the central cylinder 12. A lubricated steel bearing or bushing is disposed within the housing around each support shaft, for example as shown al 34 around support shaft 28, to allow free movement of the support shafts through the housing. The bearings or bushings are of a typical design and preferably include precision recirculating ball bearings. The support shafts are attached at one end to the tooling plate 24 to provide support for the tooling plate as the plate moves linearly toward and away from the cylinder housing 18 on piston 20, and are preferably attached at their other end to a rear support plate 35. T-shaped longitudinal channels or slots 36 and/or other appropriate apertures can be formed on the surface of the housing 18 such that remote apparatus, shock absorbers, switches, etc. can be attached to and supported by the housing for use with the linear device. A linear device appropriate for the present invention is available from the assignee of the present invention under the Model XLR Series Reach Slides, although the principles of the present invention are of course applicable to other types of linear devices.

Figure 2:
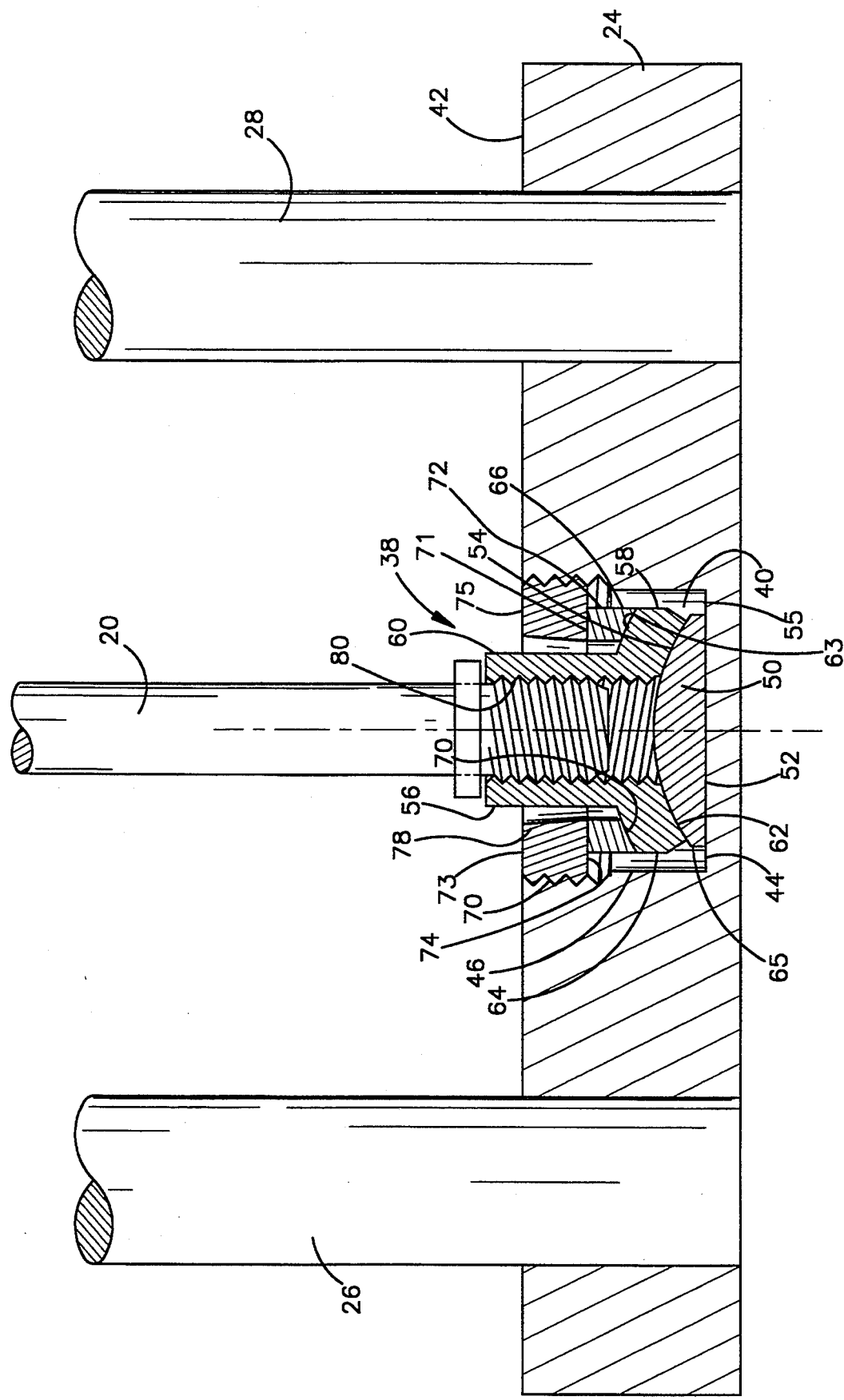
FIG. 2 is a cross-sectional side view of the tooling plate illustrating the alignment coupler in one orientation.

Referring now to FIG. 2, the alignment coupler of the present invention is indicated generally at 38 and interconnects the tooling plate 24 with the drive piston 20. The alignment coupler 38 is disposed within a cavity 40 formed at least partially through the tooling plate 24 from the outer planar surface 42. The cavity 40 includes a laterally-extending planar endwall 44 and a cylindrical sidewall 46 which extends longitudinally outward from the endwall 44 to the surface 42.

The alignment coupler includes an annular, dome-shaped bearing pad 50 which is disposed within the tooling plate cavity 40. The bearing pad 56 includes an inner planar surface 52 located adjacent to and in sliding engagement with the planar inner endwall 44, and an outer convex curved surface 54 on the opposite side of the bearing pad facing away from the inner endwall. The radius of the outer curved surface 54 can vary depending upon the particular application, as will be apparent upon reading the following specification. The inner planar surface 52 and outer curved surface 54 are interconnected by a sidewall 55 extending circumferentially around the bearing pad in the longitudinal direction. The bearing pad is formed of an appropriate material (preferably carbon steel), and grease (not shown) can be applied between the bearing pad 50 and the inner endwall 44 of the cavity to allow the bearing pad to slide freely against the endwall 44.

The alignment coupler further includes a carbon steel T-shaped operating rod or member 56 which has an annular, cup-shaped shoulder flange 58 located within the cavity 40, and an integral cylindrical stem 60 extending outwardly from the cavity. The shoulder flange 58 of the operating rod 56 has an inner concave curved surface 62 with a radius of curvature which substantially matches the radius of curvature of the outer convex surface 54 of the bearing pad. In other words, the curved surface 62 on shoulder flange 58 is concentric with the outer curved surface 54 of the bearing pad 50. The inner curved surface 62 of the shoulder flange is disposed adjacent the outer curved surface 54 of the bearing pad such that the operating rod can slide freely against the bearing pad. The shoulder flange 58 further includes an outer convex curved surface 63 extending circumferentially around the stem 60 which has substantially the same center of curvature as the inner curved surface 62. A first longitudinal sidewall 64 and a second angled sidewall 65 extend circumferentially around the shoulder flange 58 and interconnect the inner curved surface 62 with the outer curved surface 63.

An annular bearing washer 66 is disposed within the cavity 40 against shoulder flange 58. The bearing washer 66 includes an inner concave curved surface 70 adjacent the outer curved surface 63 of the shoulder flange. The radius of curvature of the inner curved surface 70 substantially matches the radius of curvature of the outer curved surface 63 of the shoulder flange 58, that is, the inner curved surface 70 of the bearing washer 66 preferably is concentric with the outer curved surface 63 of the shoulder flange 58. The bearing washer 66 also has a flat, planar outer surface 71, and a circumferentially-extending sidewall 72 which interconnects the inner surface 70 and the outer surface 71.

An annular metal end cap 73 at least partially covers the entrance or opening to the cavity 40. The end cap 73 includes an inner planar surface 74 and an outer planar surface 75 which are interconnected by a circumferentially-extending sidewall 76. The sidewall 76 of the end cap is threaded and has a nylon threaded locking device so that the end cap can be securely retained in the cavity 40. The end cap is received (screwed down) within a corresponding threaded portion in the sidewall 46 of the tooling plate to removably attach the end cap to the tooling plate. The end cap 73 is screwed down within the cavity until the outer surface 75 of the end cap 73 is substantially flush with the outer surface 42 of the tooling plate and the inner surface 74 bears against the outer surface 71 of the bearing washer 66 to hold the shoulder flange 58 of the operating rod against the bearing pad 50. The end cap 73 includes a central aperture or bore 78 which receives the outwardly extending stem 60 of the operating rod 56. The portion of the end cap surrounding the central bore 78 can be outwardly tapered to facilitate the angular movement of the operating rod, that is, to increase the amount that the operating rod can move in any angular direction. The amount of taper, of course, will be determined by the particular application for the linear device.

Figure 3:
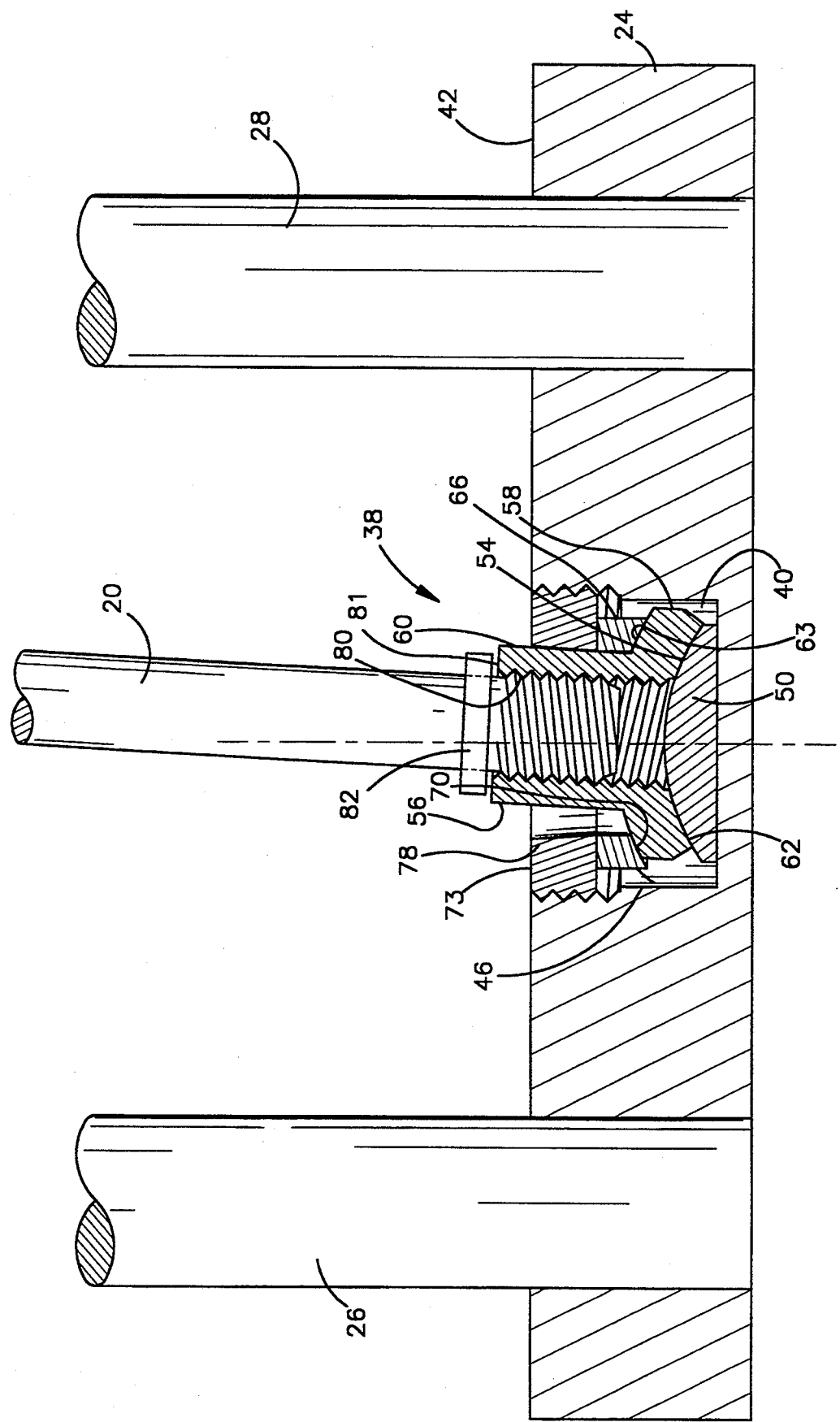
FIG. 3 is a cross-sectional side view of the tooling plate similar to FIG. 2, but showing the alignment coupler in a different orientation.

The corresponding curved surfaces of the bearing pad 50, the shoulder flange 58 of the operating rod 56, and the bearing washer 66 allow the operating rod to move in rotational as well as angular relation with respect to the tooling plate 24. As illustrated in FIG. 3, the shoulder flange 58 can move between (and against) the outer surface 54 of the bearing pad and the inner surface 70 of the washer 66 in rotational and angular directions. When the operating rod moves angularly in one direction, the stem 60 of the operating rod contacts the portion of the end cap 73 surrounding the central aperture 78 to thereby limit the movement. The bearing pad 50 may also move (laterally) in the opposite direction. Preferably, the center of curvature of the outer surface 54 of the bearing pad, the inner surface 62 of the operating rod shoulder flange,, the outer surface 63 of the operating rod shoulder flange, and the inner surface 70 of the bearing washer are the same such that the operating rod 56 moves freely between these components. The radius of curvature between the adjacent surfaces of the bearing pad 50, the shoulder flange 58, and the bearing washer 66, can vary depending upon the particular application, i.e., the anticipated angular misalignment of the piston rod 20 with respect to the tooling plate 24.

Further, as also illustrated in FIG. 3, the operating rod can move laterally within cavity 40 between the sidewall 46. To this end, the outer diameter of the bearing pad 50, the shoulder flange 58, and the bearing washer 66 are less than the inner diameter of the cavity sidewall 46. When the operating rod 56 moves laterally within the cavity 40, the bearing pad 50 slides across the inner endwall 52 of the cavity and the stem 60 moves from one side to the other of the end cap aperture 78. The diameter of the end cap aperture 78 thereby also defines and limits the lateral movement of the operating rod. The outer radius of the bearing pad 50, the shoulder flange 58 and the bearing washer 66 can also be varied depending upon the particular application, i.e., the anticipated lateral misalignment of the piston rod 20 with respect to the tooling plate 24. Thus, as described above, the operating rod can move freely in rotational, angular and lateral relation with respect to the tooling plate 24.

The stem 60 of the operating rod 56 includes a threaded central bore 80 extending longitudinally through the operating rod for receiving the threaded end of the piston rod 20. The distal end 81 of the operating rod stem 60 can have a square or hexagonal cross-sectional configuration such that a fastening tool (e.g., a wrench) can be fitted therearound to tighten the drive piston down within the operating rod bore 80. Further, the drive piston rod 20 can have a nut 82 to facilitate tightening down the piston rod to the operating rod. Besides the small amount necessary to enable attachment of the piston rod (which is preferably not more than $\frac{1}{4}$ inch), the operating rod projects only a small distance away from the surface of the tooling plate such that the offset between the tooling plate and the piston rod is minimized.

To remove or replace the alignment coupler 38, the drive piston rod can be simply and easily unscrewed from the operating rod and the support shafts 26, 28 can be detached from the tooling plate. The tooling plate 24 can then be easily inspected. If the alignment coupler is to be replaced, the end cap 73 can be unscrewed from the tooling plate, and the bearing washer 66, operating rod 56, and bearing pad 50 removed and/or replaced as necessary.

As described above, the present invention provides a linear device with a novel and unique alignment coupler which is simple to install and replace, has few operating components, and which reduces the offset between the tooling plate and the piston rod of the cylinder such that the overall size of the linear device can be minimized. The alignment coupler compensates for misalignment between the piston rod and the tooling plate such that binding, catching or side-loading of the piston rod and the support shafts is reduced, thus reducing wear on the bushings or bearings surrounding the piston rod and support shafts.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An alignment coupler assembly for a linear device, comprising:

a tooling plate having a cavity extending from an outer surface through a portion of the tooling plate, said cavity defining an inner, laterally-extending planar end wall and a sidewall extending longitudinally away from said endwall; and an alignment coupler received in the tooling plate cavity, said alignment coupler including i) an end cap having a central aperture attached to the tooling plate and at least partially covering the opening to the cavity, ii) a bearing pad disposed within the cavity with a planar surface adjacent to the inner end wall in the cavity, and an outer curved surface facing away from the inner end wall, iii) an operating rod disposed within the cavity having a stem extending outwardly through the aperture in the end cap and a shoulder flange having an inner curved surface adjacent to and concentric with the outer curved surface of the bearing pad, and iv) a bearing washer disposed in the cavity between the shoulder flange of the operating rod and the end cap such that said operating rod shoulder flange can slide between and against the bearing pad and the bearing washer in rotational and angular relation with respect to the tooling plate; said bearing pad, operating rod shoulder flange, and bearing washer having an outer peripheral dimension which is less than the inner dimension of the cavity defined by the sidewall such that the bearing pad, operating rod and bearing washer can also move laterally across the sidewall in the tooling plate cavity.

2. The assembly as in claim 1, wherein said stem of the operating rod has a distal end with connector means for removably connecting the stem to a piston rod of the linear device.

3. The assembly as in claim 1, wherein said bearing washer has an inner curved surface which is adjacent to and concentric with an outer curved surface of the shoulder flange.

4. The assembly as in claim 1, wherein said end cap has an outer surface which is substantially flush with the outer surface of the tooling plate.

5. The assembly as in claim 4, wherein said end cap has a threaded sidewall which is received in a corresponding threaded portion of the sidewall of the tooling plate cavity such that said end cap is removably attached to the tooling plate.

6. The assembly as in claim 5, wherein the portion of end cap surrounding the end cap aperture is outwardly tapered in the longitudinal direction such that said operating rod stem can move angularly within the aperture.

7. The assembly as in claim 1, wherein said outer curved surface of said bearing pad and said outer curved surface of said operating rod shoulder flange are both convex curved, and said inner curved surface of said operating rod shoulder flange and said inner curved surface of said bearing washer are both concave curved.

8. The assembly as in claim 1, wherein said side wall has a cylindrical form with said planar endwall extending diametrically across the entire side wall, and said bearing pad, operating rod shoulder flange, and bearing washer have substantially the same radial dimensions so as to minimize the overall dimensions of the alignment coupler.

9. A linear device, comprising:

i) a cylinder housing having longitudinal bores formed therein for a pair of support shafts:

ii) a central cylinder mounted within said housing, said central cylinder having a longitudinally-moveable drive piston and sealing means surrounding said drive piston to prevent fluid from leaking around said piston, said drive piston also having lateral, angular and rotational components of motion as said drive piston moves longitudinally;

iii) a pair of support shafts disposed on opposite sides of said central cylinder in said housing and extending through the bores for linear movement therein;

iv) a plate attached to a distal end of each of the support rods and a distal end of the piston rod, said plate including a central cavity extending longitudinally through a portion of the plate, the central cavity defining an inner, laterally-extending endwall, and a cylindrical sidewall extending longitudinally away from said endwall; and v) an alignment coupler received in the plate cavity, said alignment coupler including a) a bearing pad disposed within the cavity with an inter, generally planar surface in sliding engagement with the inner endwall in the cavity, and an outer curved surface facing away from the inner endwall, b) an operating rod disposed within the cavity having a stem extending outwardly from the cavity and fixed to the drive piston of the central cylinder and a shoulder flange having an inner curved surface adjacent to and concentric with the outer curved surface of the bearing pad such that said operating rod can slide against the bearing pad in rotational and angular relation with respect to the plate, and c) a bearing disposed in the cavity adjacent the shoulder flange of the operating rod and retained in the cavity against longitudinal movement; said bearing pad, operating rod shoulder flange and bearing having an outer peripheral dimension which is less than the inner dimension of the cavity defined by the sidewall such that the bearing pad, the operating rod, and the bearing can move laterally across the sidewall in the plate cavity.

10. The device as in claim 9, further including an end cap removably attached to said plate and retaining said bearing pad, operating rod shoulder flange and bearing within the cavity.

11. The device as in claim 10, wherein said bearing is disposed between said end cap and said operating rod shoulder flange, and said bearing includes an inner curved surface adjacent to and concentric with an outer curved surface of said operating rod shoulder flange.

12. The device as in claim 11, wherein said operating rod stem has a threaded distal end extending through an aperture in the end cap and said piston rod has a corresponding threaded distal end removably connected to said threaded distal end of said operating rod stem.

13. The device as in claim 12, wherein said stem of said operating rod extends outwardly through the aperture in the end cap no more than ¼ inch.

14. The device as in claim 13 wherein said end cap has an outer surface which is substantially flush with an outer surface of the tooling plate.

15. The linear device as in claim 9, wherein the bearing pad, operating rod shoulder flange and bearing having substantially the same radial dimensions so as to minimize the overall dimensions of the alignment coupler.

16. A linear device, comprising:

a cylinder housing having longitudinal bores formed therein for a pair of support shafts, a central cylinder rod mounted to said cylinder housing and having a longitudinally-moveable drive piston with sealing means surrounding said drive piston to prevent fluid from leaking around said drive piston, and a pair of support shafts disposed on opposite sides of said central cylinder and extending through the bores in the housing for linear movement therein, a plate attached to a distal end of each of the support rods and a distal end of said drive piston, said plate including a central cavity extending longitudinally through a portion of the plate which defines an inner, laterally-extending end wall, and a sidewall extending longitudinally away from said endwall, and an alignment coupler received in the cavity in the plate, said alignment coupler including i) a bearing pad disposed within the cavity having an inner, generally planar surface disposed adjacent to the inner endwall in the cavity, and an outer curved surface facing away from the inner endwall, ii) an operating rod disposed within the cavity having a stem extending outwardly from the cavity not more than ¼ inch and being removably attached to the drive piston, and a shoulder flange having an concave curved surface adjacent to and concentric with the outer curved surface of the bearing pad such that said operating rod can move in rotational and angular relation with respect to the plate, said bearing pad and operating rod shoulder flange having an outer peripheral dimension which is less than the inner dimension of the cavity defined by the sidewall such that the operating rod can move laterally across the sidewall.

17. The device as in claim 16, further including an end cap attached to the tooling plate and retaining the bearing pad and operating rod shoulder flange; within the cavity.

18. The device as in claim 17, further including a bearing washer disposed between the operating rod shoulder flange and the end cap, said bearing washer having an inner curved surface adjacent to and concentric with an outer curved surface of the operating rod shoulder flange, and an outer surface adjacent to an inner surface of the end cap.

19. The device as in claim 18, wherein said curved surface of said bearing pad, said curved surfaces of said operating rod shoulder flange, and said curved surface of said bearing all have the same center of curvature.

20. The device as in claim 19, wherein said outer curved surface of said bearing pad and said inner curved surface of said operating rod shoulder flange are oppositely facing and in sliding engagement with each other, and said outer curved surface of said operating rod shoulder flange and said inner curved surface of said bearing are also oppositely facing and in sliding engagement with each other.

21. The device as in claim 20, wherein the end cap does not extend outwardly past the outer surface of the tooling plate.

22. The assembly as in claim 16, wherein said bearing pad and said operating rod shoulder flange have substantially the same radial dimensions so as to minimize the overall dimensions of the alignment coupler.

23. The assembly as in claim 19, wherein said bearing pad and said operating rod shoulder flange have substantially the same radial dimensions so as to minimize the overall dimensions of the alignment coupler.

* * * * *